United States Patent

Horiuchi et al.

[11] Patent Number: 5,877,958
[45] Date of Patent: Mar. 2, 1999

[54] APPARATUS FOR CONTROLLING AN AUTOMOBILE ENGINE WHICH IS SERIALLY CONNECTED TO SYSTEM SENSORS

[75] Inventors: Michimasa Horiuchi; Kenji Tabuchi, both of Katsuta, Japan

[73] Assignee: Hitachi, Ltd., Japan

[21] Appl. No.: 511,046

[22] Filed: Aug. 3, 1995

Related U.S. Application Data

[63] Continuation of Ser. No. 200,957, Feb. 24, 1994, abandoned.

[30] Foreign Application Priority Data

Feb. 25, 1993 [JP] Japan ................... 5-036933

[51] Int. Cl.⁶ ........................................ G05B 9/03
[52] U.S. Cl. ........................................ 364/431.04
[58] Field of Search ................ 364/424.04, 424.03, 364/424.05, 431.04; 123/361; 395/182.09

[56] References Cited

U.S. PATENT DOCUMENTS

| | | | |
|---|---|---|---|
| Re. 31,582 | 5/1984 | Hosaka et al. ........... | 364/431.04 |
| 4,271,518 | 6/1981 | Birzele et al. ........... | 371/37.1 |
| 4,388,683 | 6/1983 | Beifuss et al. ........... | 395/325 |
| 4,551,803 | 11/1985 | Hosaka et al. . | |
| 4,791,569 | 12/1988 | Suzuki . | |
| 4,797,828 | 1/1989 | Suzuki et al. ........... | 364/431.04 |
| 4,881,227 | 11/1989 | Buhren ........... | 395/182.09 |
| 5,055,842 | 10/1991 | Mueller ........... | 341/100 |
| 5,142,474 | 8/1992 | Miyata et al. ........... | 364/424.03 |
| 5,274,554 | 12/1993 | Takats et al. ........... | 364/424.03 |
| 5,436,837 | 7/1995 | Gerstung et al. ........... | 364/424.03 |
| 5,482,019 | 1/1996 | Ausiello et al. ........... | 123/361 |

FOREIGN PATENT DOCUMENTS

| | | |
|---|---|---|
| 36 23 829 A1 | 4/1987 | Germany . |
| 37 20 879 C2 | 2/1989 | Germany . |
| 30 01 331 C2 | 7/1989 | Germany . |
| Hei 4-203344 | 8/1992 | Japan . |
| 2 103 836 | 8/1983 | United Kingdom . |

Primary Examiner—Kevin J. Teska
Assistant Examiner—Dan Fiul
Attorney, Agent, or Firm—Evenson, McKeown, Edwards & Lenahan P.L.L.C.

[57] ABSTRACT

A control unit having at least one microprocessor for receiving input data signals from sensors indicative of operating parameters of the at least one system, and for generating first control signals to control operation of said at least one system in response to said input data signals. At least one input/output unit is coupled to receive the input data signals from the sensors in a parallel transmission format and to transmit output control signals to the systems in a parallel transmission format. A backup logic system provides backup control signals when transmission of the control signal is interrupted.

13 Claims, 9 Drawing Sheets

APPARATUS FOR CONTROLLING AN AUTOMOBILE ENGINE WHICH IS SERIALLY CONNECTED TO SYSTEM SENSORS

This application is a continuation of application Ser. No. 08/200,957, filed on Feb. 24, 1994, now abandoned.

BACKGROUND OF THE INVENTION

The present invention relates to an apparatus for controlling an automobile engine, and more particularly to an apparatus for interconnecting a plurality of engine control systems by serial data transmission.

As automobile controls become more sophisticated, the volume of signal communications between them and the number of sensors and actuators increase. As a result, the number of couplings among control apparatuses increases. One method which has been developed to reduce the wiring requirement for interconnection of engine controls and actuators is to provide for serial data transmission by means of input/output (I/O) units which are separate from the central control unit. For example, in Japanese Patent Application Laid-Open No. 4-203344, necessary data is transmitted to and from control units such as an engine control unit and a transmission control unit, serially by microcomputer programs, according to predetermined transmission procedures. It is thus possible to transmit data serially to two separate control units by using respective microcomputers. However, since each control unit has its own microcomputer for the purpose of processing parallel-serial transmission of information multiple microcomputers are used for the same control function, and the required amount of hardware and software increases.

Moreover, in the aforementioned serial transmission arrangement, the drive interface for the ignition coil of the engine control apparatus and for the fuel injection valve is provided as a separate I/O unit. Thus, when such serial data transmission is utilized, a failure of the transmission line, such as a disconnection of an optical fiber or a faulty electrical contact, interrupts the transmission of signals from the control unit, and the automobile is no longer operable.

SUMMARY OF THE INVENTION

An object of the present invention, therefore, is to provide a signal transmission apparatus for controlling an automobile engine, having an I/O unit which allows the automobile to run, even if transmission signals are eliminated.

This and other objects and advantages are achieved by the automobile engine control apparatus according to the present invention, which has a control unit, an I/O unit consisting of an actuator driving unit and a sensor input unit, apparatus for transmitting an input information signal from a sensor of the I/O unit serially to the control unit and apparatus for transmitting an output information signal of the control unit serially to the I/O unit, wherein the I/O unit has a backup which can operate independently without being affected by output from the control unit.

More specifically, the automobile engine control apparatus of the present invention includes: an I/O unit which has a plurality of sensors for determining the status of an automobile engine, an actuator driving unit for controlling each functional part of the engine, and a backup unit which can operate independently without being affected by output from the external control unit; a control unit having an arithmetic unit for transmitting an output information signal to the actuator driving unit based on an input information signal from the sensor; and a serial transmission line for connecting the I/O unit and the control unit.

The I/O unit according to the invention has apparatus for converting the input information signal from a parallel format to serial format and transmitting it to the serial transmission line; apparatus for converting the output information signal, which is serially transmitted from the control unit via the serial transmission line, from serial format to parallel format and transmitting it to the actuator driving unit; apparatus for detecting an error in information transmitted via the serial transmission line and for generating a detection signal indicative thereof; and a unit for receiving an error detection signal and operating the backup means.

The control unit has apparatus for converting the input information signal, which is serially transmitted from the I/O unit via the serial transmission line, from serial to parallel format, and for transmitting it to the arithmetic means; and a unit for converting the output information signal (from the arithmetic unit) from parallel to serial format and transmitting it to the serial transmission line. The input information signal includes at least a cylinder signal and rotation angle signal of the engine.

The apparatus for detecting an error in transmission information, referred to above, includes a unit for detecting an error in information from the control unit and the engine cylinder signal, a unit for detecting an error when an ignition signal of the engine (transmitted from the control unit after the I/O unit detects the engine cylinder signal) is interrupted for a predetermined number of reference pulses, or a unit for detecting an error based either on an output from the preceding error detection unit (relating to the engine ignition signal) or on an output from a unit for detecting a reset signal of the control unit (transmitted from the control unit).

The I/O unit according to the invention converts a parallel signal from the sensor to a serial signal and transmits it to the control unit via the transmission line. The control unit converts the signal from serial to parallel format and transmits it to the arithmetic unit, which generates an output information signal based thereon. This output signal is converted from parallel to serial format, and transmitted to the I/O unit via the transmission line. The I/O unit receives the serial signal, converts it to a parallel signal and outputs it to the error detection means. When no error is detected, the backup unit outputs an ignition signal and a fuel injection signal according to a signal transmitted from the control unit so as to drive the actuator. On the other hand, when an error is detected, the backup unit independently outputs an ignition signal and fuel injection signal SG to drive the actuator.

Other objects, advantages and novel features of the present invention will become apparent from the following detailed description of the invention when considered in conjunction with the accompanying drawings.

BRIEF DESCRIPTION OF THE DRAWINGS

FIGS. 3B.1–3B.4 are diagrams of signals generated in FIG. 3a;

FIGS. 3D.1–3D.22 are diagrams of signals generated in connection with the backup logic circuit of FIG. 3C;

DETAILED DESCRIPTION OF THE DRAWINGS

Figure 1:
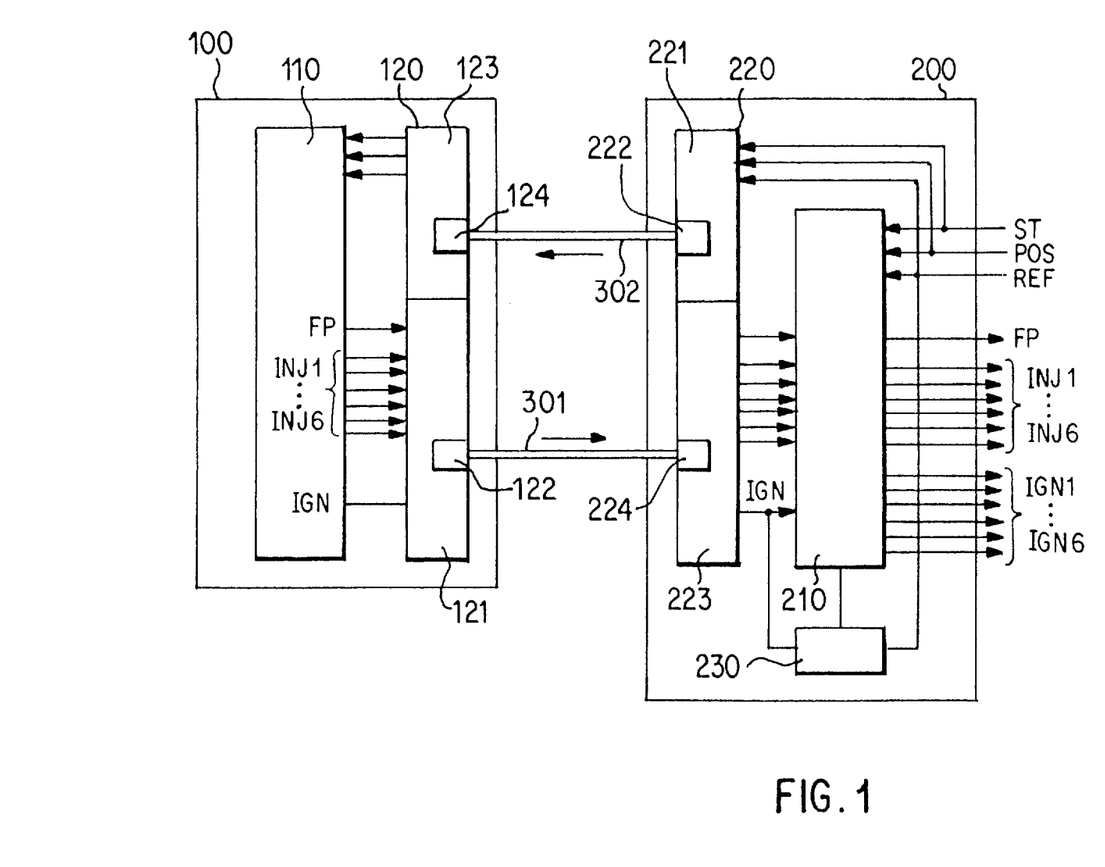
FIG. 1 is a conceptual block diagram of an automobile engine control apparatus of an embodiment of the present invention.
Figure 2A:
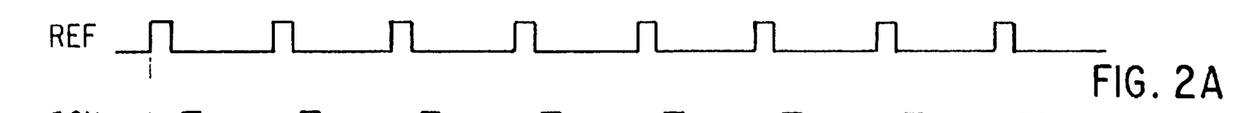
FIG. 2 is a diagram of ignition signals and fuel injection signals which are transmitted.
Figures 2B, 2C:
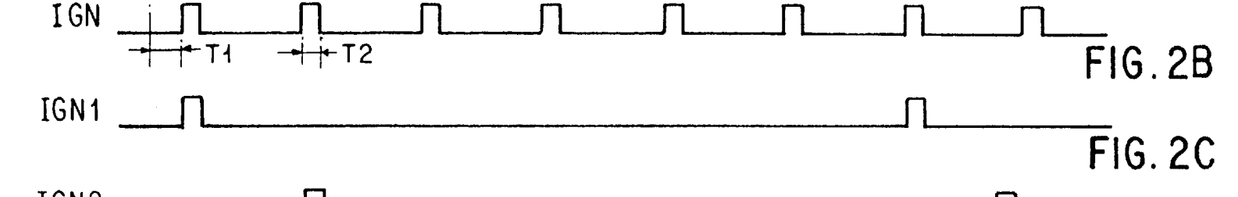
Figure 2D:
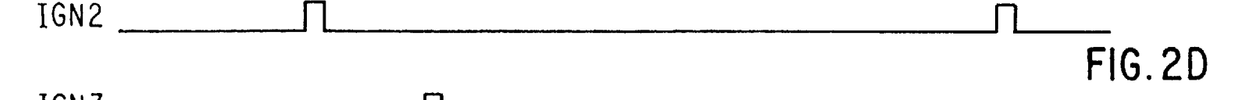
Figure 2E:
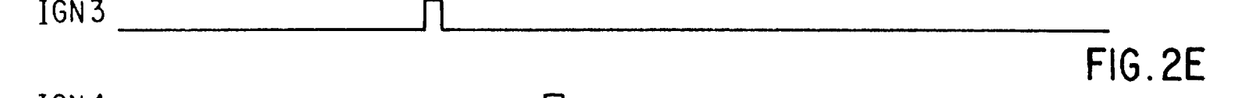
Figure 2F:
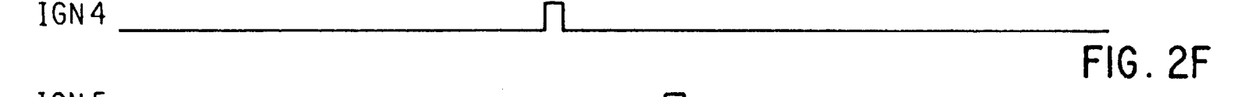
Figure 2G:
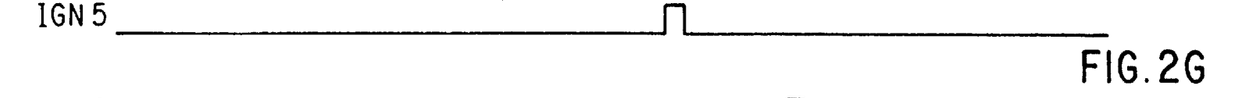
Figure 2H:
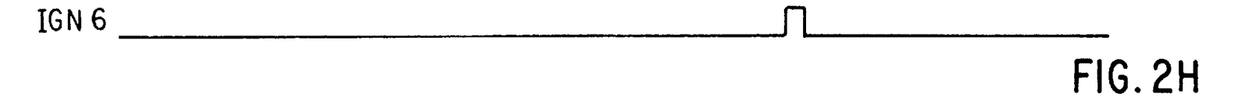
Figures 2I, 2J:
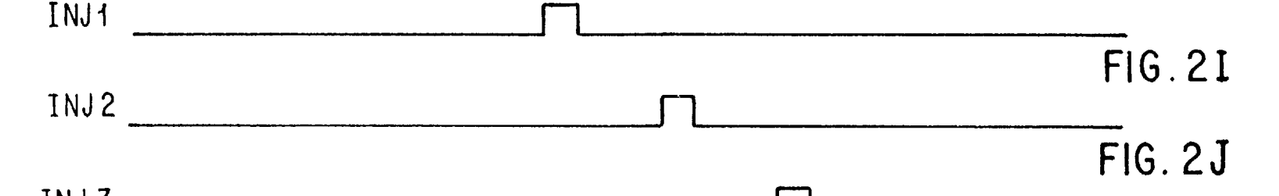
Figures 2K, 2L, 2M, 2N:
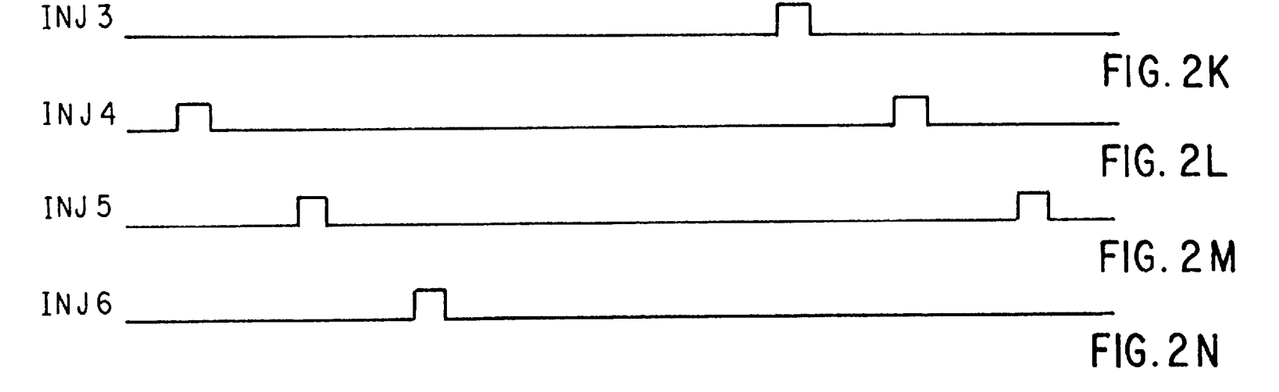

FIG. 1 is a block diagram of a first embodiment of the control apparatus of the present invention. A control unit 100 and an I/O unit 200 are connected by transmission lines 301 (from the control unit 100 to the I/O unit 200) and 302 (from the I/O unit to the control unit) so that data can be transmitted serially between them, in both directions.

The I/O unit 200 reads a parallel signal, consisting of an engine cylinder signal REF, a rotation angle signal POS, and a starter signal ST, into a backup logic circuit 210, and also into a parallel-serial conversion circuit 221, which converts the parallel signal to a serial format, and transmits it to the control unit 100 via a transmission interface 222 and the transmission line 302. Parallel-serial conversion circuit 221 may be a commercially available standard integrated circuit, such as for example HD74HC166 made by Hitachi, Ltd. Or, a combined parallel-serial converter and interface unit model MS16T made by Mitsubishi Rayon Company of Japan may also be used.

The control unit 100 receives the serial signal from the transmission line 302 via a reception interface 124, converts it to a parallel format in a serial-parallel conversion circuit 123 (e.g., HD74HC166 or MS16R), and supplies it to a CPU (microcomputer) 110. The CPU 110 uses the information contained in the signal to calculate the ignition timing and fuel injection amount for each cylinder of the engine, and outputs this information as pulse width signals (ignition timing signal IGN and fuel injection signals INJ1 to INJ6). Each ignition timing signal IGN is output at a predetermined time after a cylinder signal REF is output (described later) so that the signals of the six cylinders do not be overlap. Therefore, a pulse train of six cylinders can be output.

Pulse signals from the CPU 110 are supplied to a parallel-serial conversion circuit 121 (which may be the same as converter 221), converted to a serial format, and transmitted to the I/O unit 200 via a transmission interface 122 and the transmission line 301. The I/O unit 200 receives the serial signal from the transmission line 301 via a reception interface 224, converts it to parallel format in a serial-parallel conversion circuit 223 (similar to converter 123), and supplies it to the backup logic circuit 210. In normal operation (no error detected in transmission), the backup logic circuit 210 outputs ignition signals IGN1 to IGN6, fuel injection signals INJ1 to INJ6, and a fuel pump signal FP based on signals transmitted from the control unit 100 so as to drive the individual actuators.

On the other hand, when an error occurs due to failure of at least one of the transmission lines 301 and 302, a backup switching circuit 230 detects the failure (in a manner described hereinafter) and outputs an error signal 230a to the backup logic circuit 210. In this state, although the output signals normally transmitted by the control unit 100 (that is, the CPU) are cut off and are not received to the I/O unit 200, the backup logic circuit 210 reads the engine cylinder signal REF and rotation angle signal POS as input signals, and outputs independently an ignition signal and fuel injection signal, so as to drive the actuator.

The purpose of the back up logic unit 210 is to permit a limp form of vehicle operation, and not to provide optimum control of the vehicle engine such as achieved by the control unit CPU. The backup logic unit may be, for example, a hardware element known as a large scale integrated circuit (or "LSI"). As explained in greater detail hereinafter, its hard wired logic elements can process the REF and POS signals in a manner which is sufficient to provide a set of control signals to keep the engine running, although such processing is far less sophisticated than that of the CPU. That is, the signals generated by the backup logic circuit 210 cause fuel to be injected to each of the engine cylinders in the same amounts, with a fixed timing and cycle, and ignition is also performed with fixed cycle and duration, which is sufficient to keep the vehicle running, albeit at less than optimum conditions.

As mentioned above, the serial transmission arrangement between the control unit 100 and the I/O unit 200 utilizes a logic circuit configuration which does not require a separate CPU or special transmission software in the I/O unit (that is, for sharing and converting a parallel input signal to a serial output signal and transmitting it).

FIG. 2 illustrates the ignition and fuel injection signals which are transmitted in the embodiment of FIG. 1. In FIG. 2, an ignition signal IGN transmitted from the control unit 100 comprises a train of a pulses which have a pulse width T2, and which are delayed by a time T1 relative to a cylinder signal REF (a reference signal). The several ignition signals IGN1 to IGN6, which are overlaid on each other in the serial signal IGN, are distributed to the six cylinders as ignition actuator driving signals by the backup logic circuit 210. Fuel injection signals INJ1 to INJ6, on the other hand, are used directly as fuel injection actuator driving signals. The time T1, pulse width T2, and startup or shutdown of fuel injection signals vary with the operating status of the engine, and are controlled by the control unit 100.

Figure 3A:
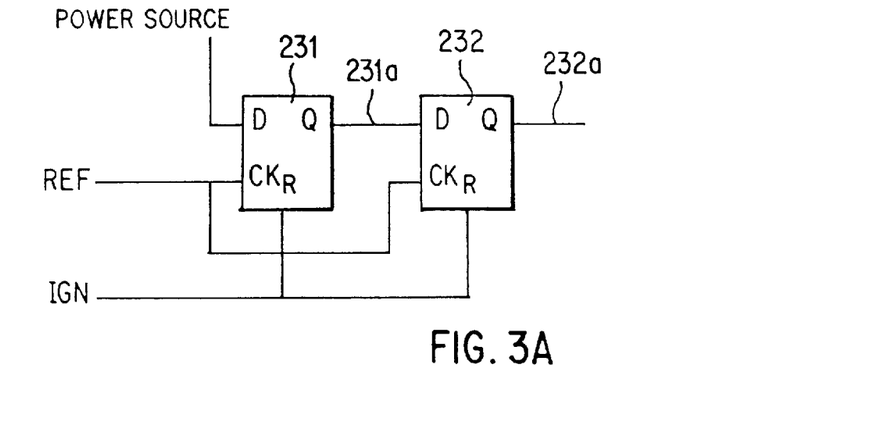
FIG. 3A shows an embodiment of a backup switching circuit.
Figure 3B:
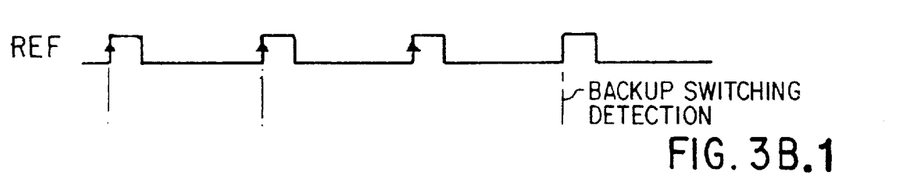
Figure 3B:
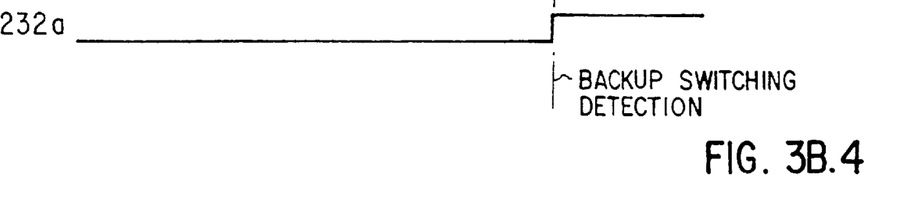
Figures 3B, 3B:
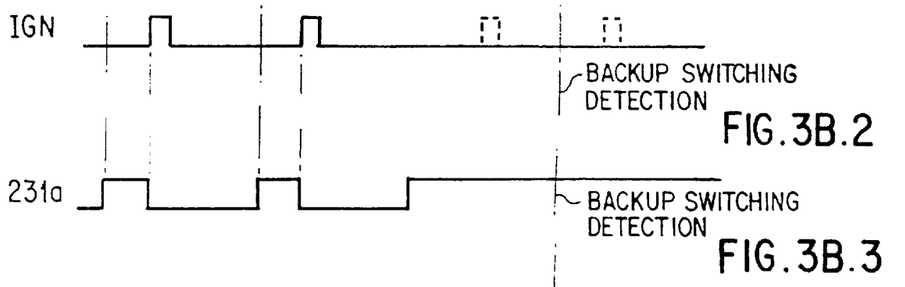

FIG. 3A shows an embodiment of the backup switching circuit 230, which detects a failure in the transmission lines 301 and 302. It consists of two stages of shift registers having flip-flops 231 and 232. When at least one of the transmission lines 301 and 302 is interrupted, either the cylinder signal REF and rotation angle signal POS are not transmitted to the control unit 100 (the transmission line 302 is cut off), or the ignition signals IGN and INJ1 to INJ6 are not transmitted to the I/O unit 200 (the transmission line 301 is cut off). When one of these occurs, the ignition signal IGN in the I/O unit 200 and the fuel injection signals INJ1 to INJ6 are eliminated simultaneously with cut-off of the transmission line. Since the engine continues to rotate by inertia early in this state, however, the cylinder signal REF continues to be supplied to the I/O unit.

In the normal state, as shown in FIG. 2, when the cylinder signal REF is input, the ignition signal IGN is always output after T1, and accordingly, the flip-flops 231 and 232 in FIG. 3A are continuously set and rest by the REF and IGN signals pulses. When the ignition signal IGN is eliminated as shown in FIG. 3B.2 (as indicated by dotted lines), however, the flip-flops 231 and 232 are not reset. Therefore, at the first REF pulse (FIG. 3B.1), the flip-flop 231 outputs 231a (FIG. 3B.3) and at the second REF pulse, the flip-flop 232 outputs a signal 232a (FIG. 3B.4) indicating the interruption of the transmission line. As a result, the backup logic circuit 210 is set to the backup status by the backup switching circuit 230, and the individual I/O unit outputs backup ignition and fuel injection signals, which drive the actuators so as to allow the automobile to run.

Figure 3C:
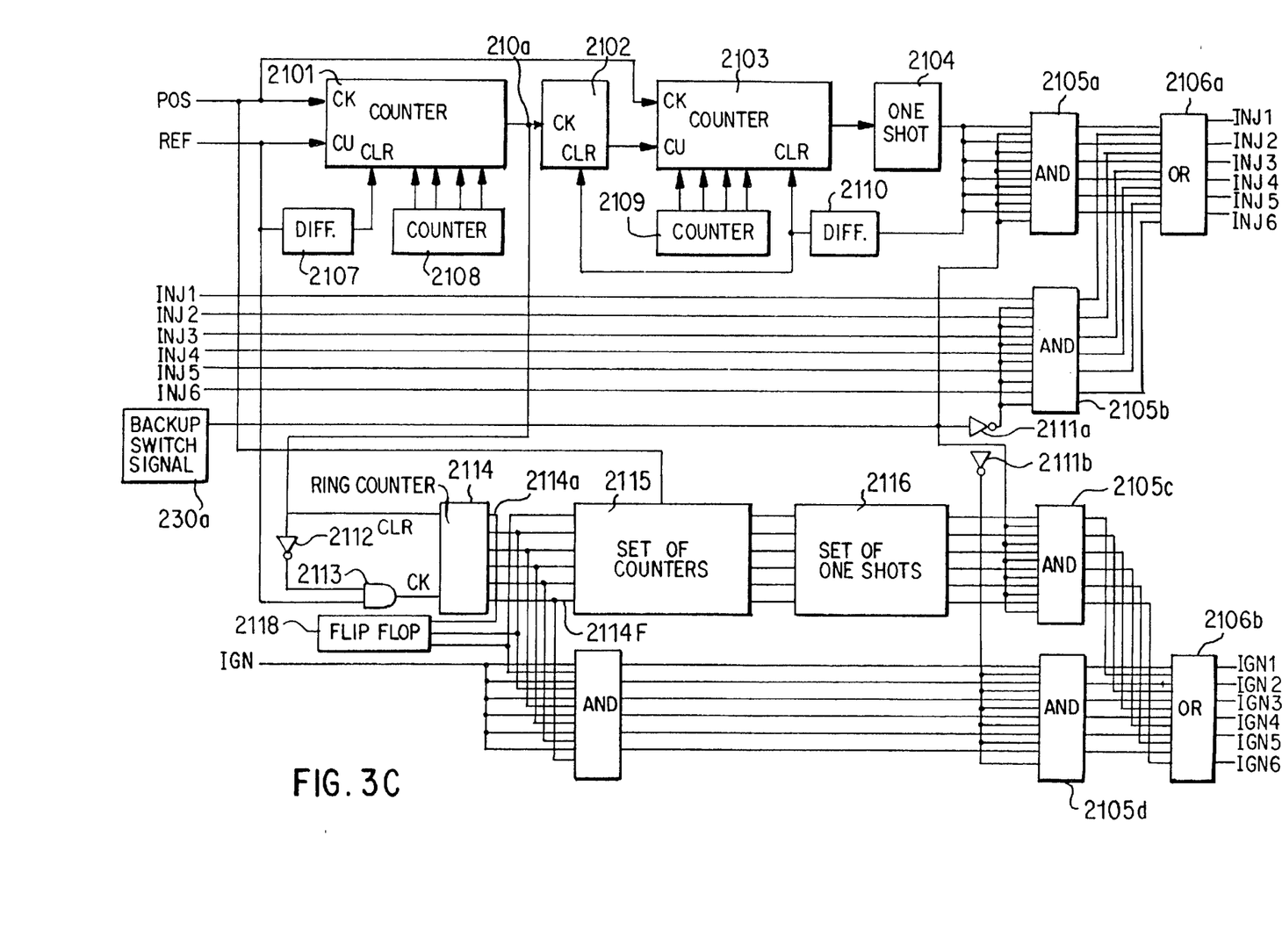
FIG. 3C is a schematic diagram of a backup logic circuit according to the invention.

FIG. 3C is a circuit diagram of the backup logic circuit 210, which illustrates the manner in which the backup ignition and fuel injection signals are generated and enabled in response to an error signal 230a from backup switching circuit 230. The injection signals INJ1 to INJ6 and the IGN signal generated by CPU 110 of control unit 100 are received by backup logic circuit 210 from serial-parallel conversion circuit 223, and entered to AND gates 2105b and 2105d, respectively. During normal operation (no error detected by backup switching circuit 230), AND gates 2105b and 2105d are enabled by signal 230a (which has been inverted by NOT gates 2111a and 2111b), and the INJ1–6 and IGN signals from control unit 100 are passed to OR gates 2106a and 2106b respectively, and used to control the vehicle engine.

However, when a transmission error is detected by the backup switching circuit 230, the AND gates 2105b and 2105d are disabled by NOT gates 2111a and 2111b in response to the error signal 230a, thus cutting off the transmission of control signals from the control unit 100; and AND gates 2105a and 2105c are enabled by the signal 230a, thus enabling the transmission of backup signals from logic circuit 210.

Figure 3D:
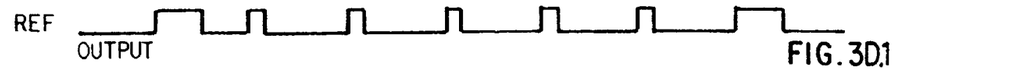
Figure 3D:
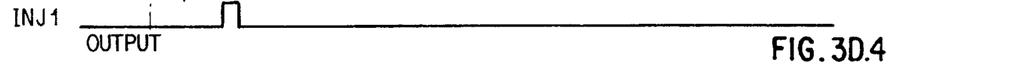
Figure 3D:
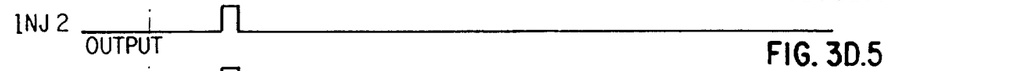
Figure 3D:
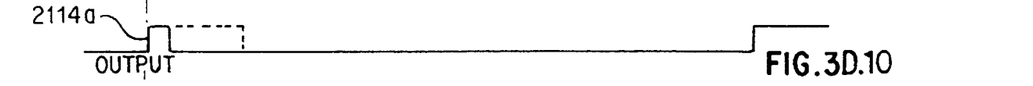
Figures 3D, 3D, 3D:
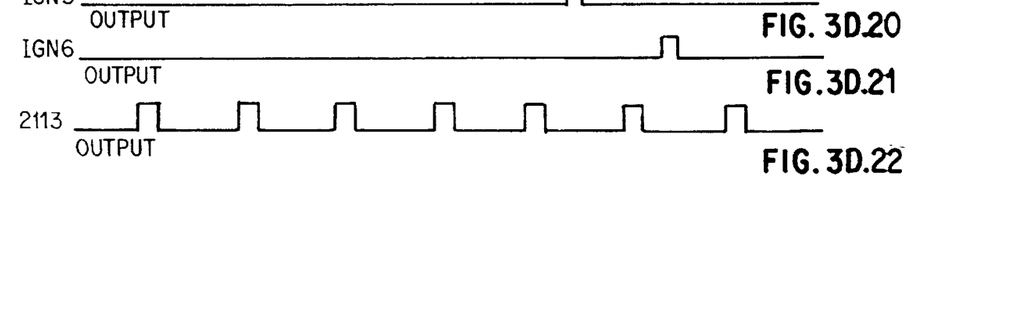
Figures 3D, 3D:
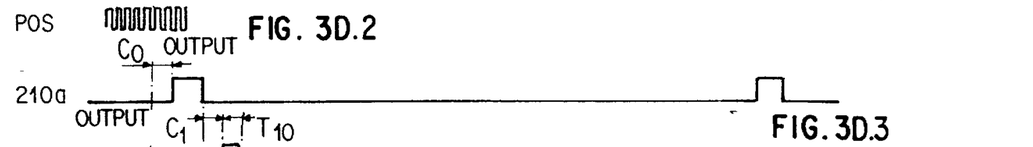

The operation of logic circuit 210 is further explained by reference to the pulse signals shown in FIGS. 3D.1–3D.22. The reference signal REF comprises a series of pulses, with the pulse corresponding to a reference (first) cylinder being longer than the others. The signal REF enables counter 2101, which counts the pulses in the rotation angle signal POS. When the count reaches a predetermined value $C_0$, stored in counter 2108, signal 210a is output from the counter 2101. It should be noted that when the signal REF falls to a logical zero, the differentiator 2107 generates a signal to clear the counter 2101, which is no longer enabled. Since at this point, the counter will have reached $C_0$ only in the case of the longer pulse associated with the first cylinder, the signal 210a is generated only for that cylinder.

Figures 3D, 3D:
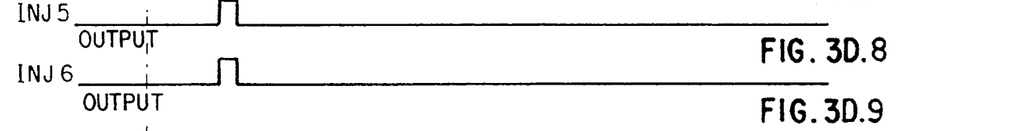
Figures 3D, 3D:
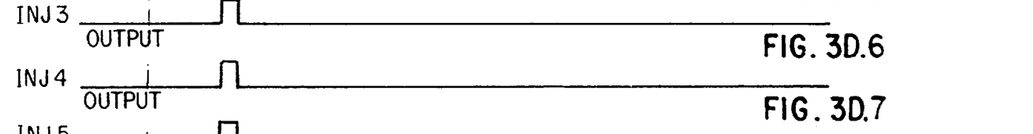

Signal 210a, commences when counter 2101 reaches a count of $C_0$, and ends when counter 2101 is reset by the differentiator 2107 at the trailing edge of the REF pulse for the first cylinder. Signal 210a is input to a D-type flip-flop circuit 2102 which outputs a signal Q to counter 2103, at the trailing edge of the first cylinder signal 210a, causing counter 2103 to read a preset value stored in the counter 2109, and to count the pulses in rotation angle signal POS. When the count reaches the value $C_1$, stored in counter 2109, backup fuel injection signals INJ1–6, having a time duration $T_{10}$ are generated by a one shot multivibrator 2104 and passed to AND gate 2105a. (At this time the flip-flop 2102 and the counter 2103 are cleared.) It should be noted that the injection signals INJ1–6 shown in FIGS. 3D.4–3D.9 are generated simultaneously in the backup mode. Such a rough injection method is obviously less desirable then the sequential injection technique based on the air flow rate, throttle opening and so on, which is used during normal engine operation. However, such simultaneous injection is sufficient to continue the operation of the engine until the problem is corrected.

Figures 3D, 3D, 3D, 3D, 3D, 3D:
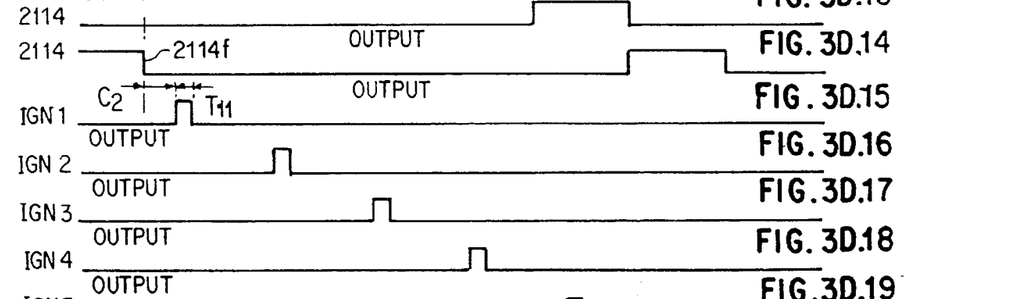
Figures 3D, 3D, 3D:
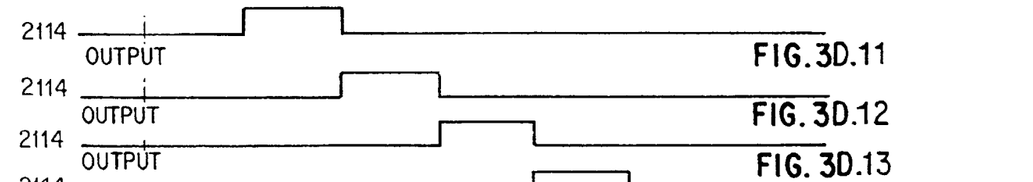

The reference signal REF and the output signal 210a from counter 2101 (which is inverted by NOT gate 2112) are entered to a logical AND gate 2113. The result is input to a six stage ring counter 2114, which generates sequential output signals 2114a–2114f, shown in FIGS. 3D.10–3D.15. (The width of the output pulse 2114a from ring counter 2114 is extended, as indicated by a dotted line in FIG. 3D.10, by the flip-flop 2118, since the pulse width between REF-REF cannot be obtained due to the effect of the CLR signal.) The signals generated by ring counter 2114 are input to a set of counters 2115, which also receive the rotation angle pulse signal POS. For each of the six sequential signals (whose respective timing corresponds with that of the REF signal), the associated counter commences counting at the inception of the logical 1 state, and when the count reaches a predetermined value C2 a signal activates one of a set of one shot multivibrators 2116 to generate an ignition signal IGN1–6, which is passed to AND gate 2105c. (The width of the ignition signals IGN1–6 is predetermined by the one shot multivibrator.) When the backup signal 230a indicates an error, the AND gate 2105c is activated, and the outputs from one shots are used as ignition signals.

In the normal operating mode (no transmission errors), the backup logic circuit 210 receives the INJ and IGN signals generated by the control unit 100, and passes them through as outputs to control operation of the vehicle systems. When, however, transmission of the INJ and IGN signals via lines 301 and 302 is interrupted, an error signal from the backup switching circuit causes the backup logic circuit 210 to output locally generated backup signals INJ and IGN. Therefore, even if transmission of signals from the control unit is eliminated, the individual I/O unit can output an ignition signal and fuel injection signal, such that an automobile can continue to run.

Figure 4:
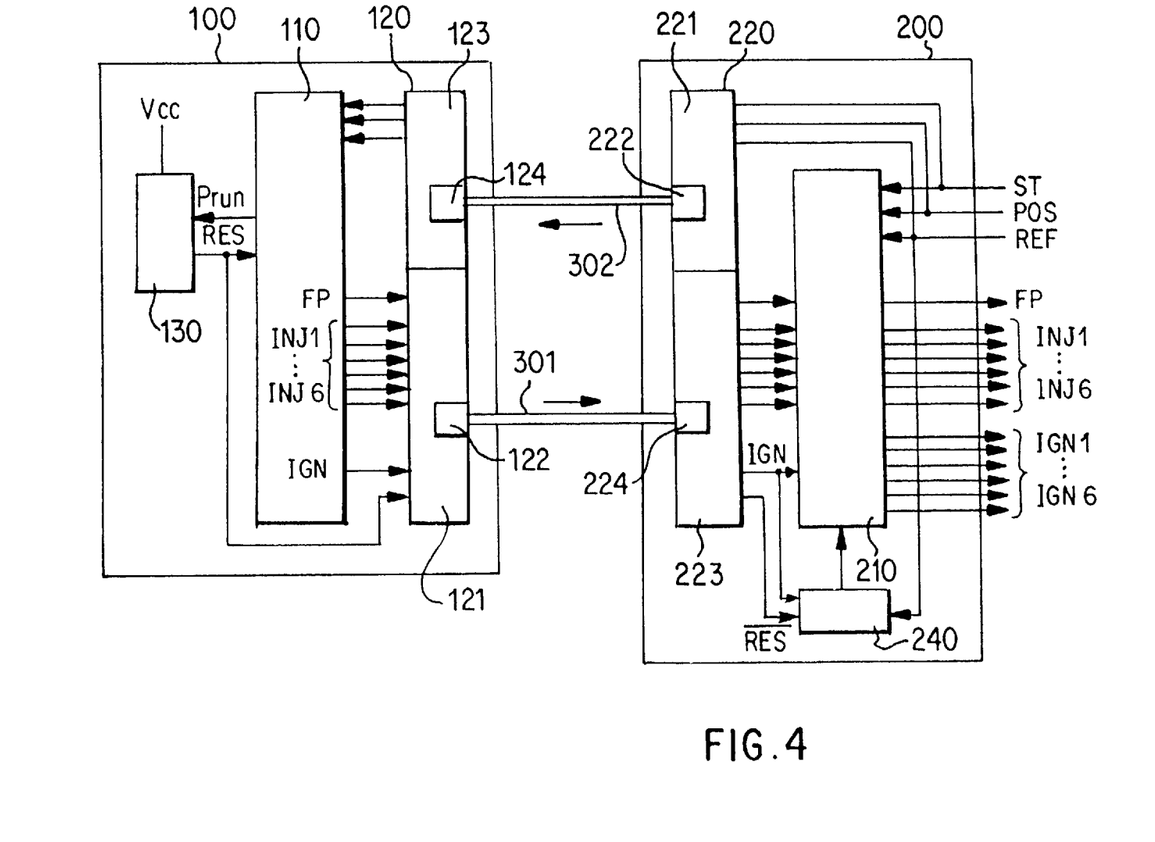
FIG. 4 is a conceptual block diagram of an automobile engine control apparatus of another embodiment of the present invention.

FIG. 4 is a block diagram of another embodiment of the present invention. Elements in FIG. 4 having the same function as those of the previous embodiment have the same numeral as in FIGS. 1 and 3, and further explanation thereof is omitted.

In FIG. 4, numeral 130 indicates a monitor circuit for detecting a reset (RES) or a runaway (Prun) of CPU 110. To detect CPU malfunction, the monitor 130 is connected to receive a signal Prun, which is output periodically by the CPU when it is operating properly. The monitor 130 also connects the reset signal RES to the parallel input terminal of the parallel-serial conversion circuit 121, which transmits it to the I/O unit 200.

Figure 5:
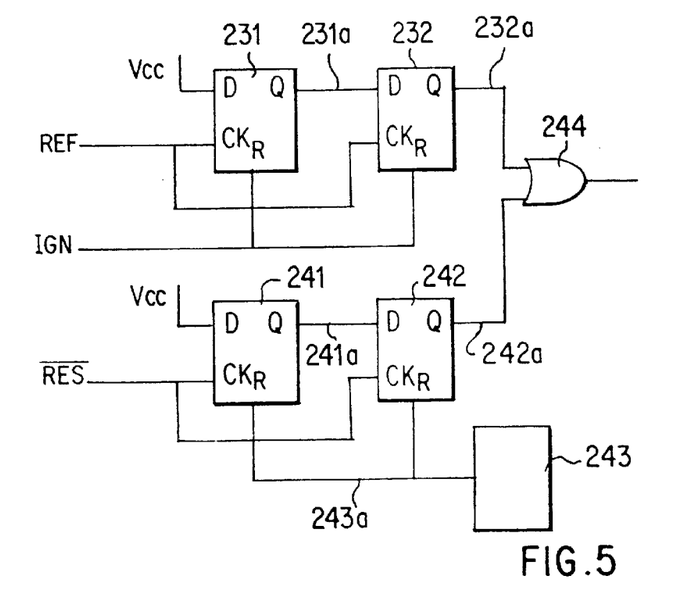
FIG. 5 shows another embodiment of a backup switching circuit.

FIG. 5 is a block diagram of a backup switching circuit 240 of the I/O unit 200 in FIG. 4. The circuit configuration for inputting the cylinder signal REF and ignition signal IGN, and the operation thereof, are the same as those shown in FIG. 3. In addition, a 2-stage shift register configuration consisting of flip-flops 241 and 242 receives the RES signal, with the output of a frequency signal generator 243 connected to the reset input of the flip-flops 241 and 242.

Figures 6A, 6B, 6C, 6D:
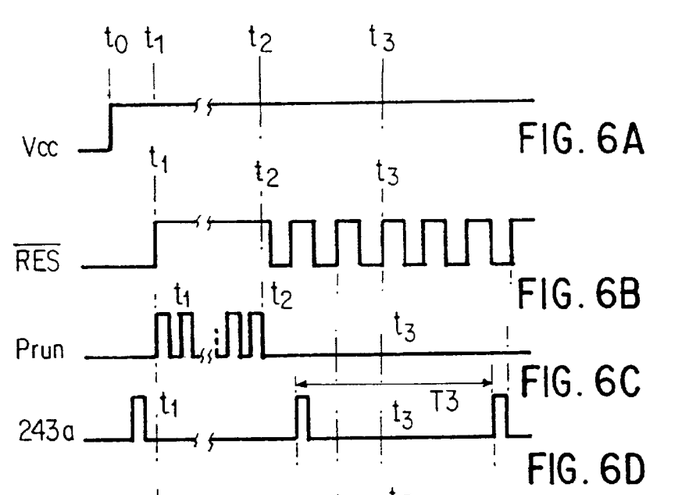
FIG. 6 is a diagram of signals generated in the backup switching circuit of FIG. 5.
Figure 6E:
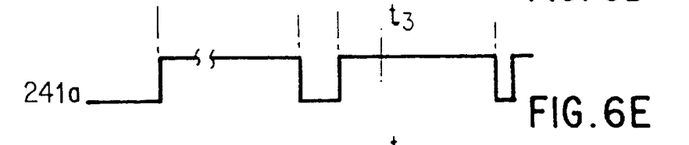
Figure 6F:
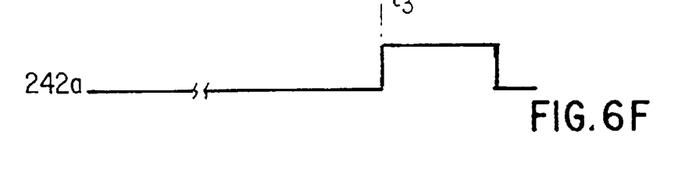

FIG. 6 shows the operation of the backup switching circuit 240. The control unit 100 is turned on at a time t0; after a reset time t1 elapses, the monitor circuit 130 generates a reset signal to start operation of the CPU 110, which outputs a pulse signal Prun during normal operation. In this state, the RES signal remains at 1 and the flip-flop 242 outputs no signal; thus the flip-flops 231 and 232 of the backup switching circuit 240 operate in the same manner as those in the circuit 230 of FIGS. 1 and 3. When the CPU 110 malfunctions at time t2, the signal Prun is zeroed, the RES signal alternates between a 1 and 0 on a fixed cycle, to reset the CPU 110. The frequency 5 signal generator 243 resets the flip-flops 241 and 242 on a cycle of T3. When leading edge of the signal RES is detected once within the cycle T3, the flip-flop 241 outputs 241a and when it is detected a second times, the flip-flop 242 outputs 242a. At time t3, the backup switching circuit 240 outputs a signal which sets the backup logic circuit 210 into the backup status, and the individual I/O unit 200 outputs a unique ignition signal and fuel injection signal so as to drive the actuator, and the automobile can run.

According to this embodiment, if the CPU 110 enters a runaway state and a spurious ignition signal IGN is output, the backup logic circuit is set to the backup status surely. In FIG. 5, when the second pulse of the RES signal is detected, the backup switching circuit 240 generates an output signal. However, the invention is not limited to detection of the second RES pulse. As those skilled in the art will recognize, that is, the backup switching circuit may easily be designed to output a signal upon detection of one, three or four pulses, etc.

Similarly, in the example shown in FIG. 3, when the ignition signal IGN is eliminated and the signal REF rises two times, the backup switching circuit 230 outputs an error signal. However, if an extension of time caused by mixture of noise is taken into account, the invention is not restricted to two times, and the rising count may be more than two times.

Figure 7:
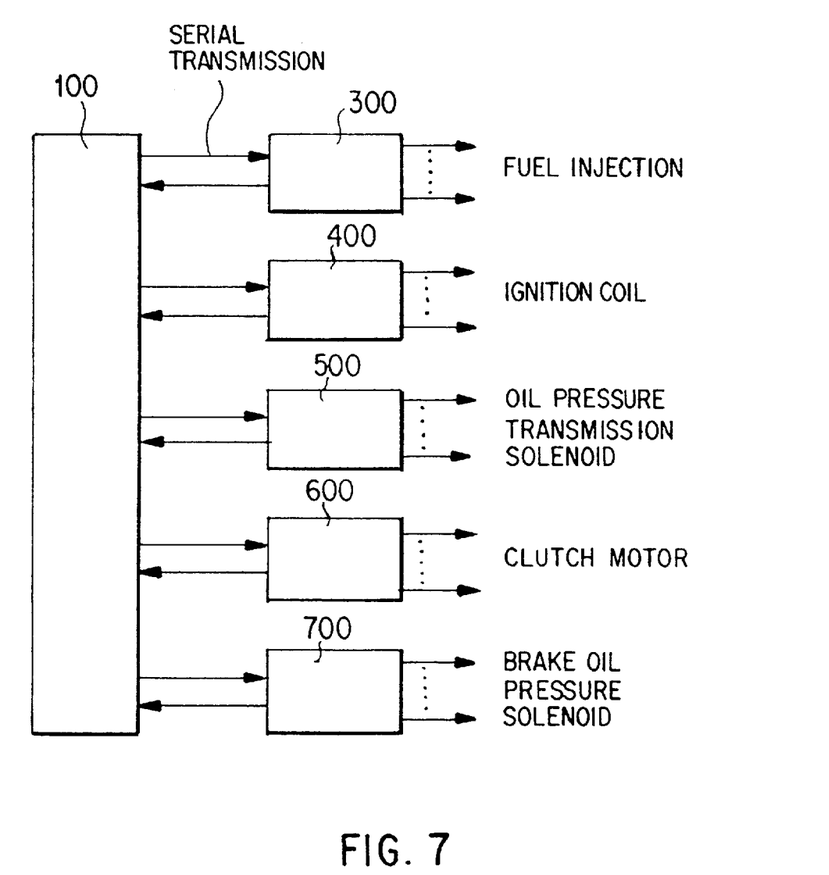
FIG. 7 shows an embodiment of the invention having a plurality of input/output units.

In the embodiments described above, a single input/output unit 200 is used to interface with the control unit 100. However, as shown in FIG. 7, several input/output units 300–700, may be used to interface multiple controlled systems with a single control unit 100, which serves as a master controller. Signals are serially transmitted to control input/output actuators. This embodiment provides enhanced control sensitivity, because the control unit 100 can intensively manage input/output data.

According to the automobile engine control apparatus of the present invention, even if an error occurs in the serial transmission line and transmission signals from the control unit are eliminated, and the automobile can run. Furthermore, even if a runaway occurs in the microcomputer, the automobile can run safely.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for controlling a vehicle engine, comprising:
a control unit having a microprocessor for receiving input data signals from sensors indicative of operating parameters of said vehicle engine, and for generating first control signals to control operation of said vehicle engine in response to said input data signals, said input data signals including engine cylinder signals indicative of operation of said vehicle engine, and said first control signals including engine control signals;
an input/output unit comprising at least an actuator driving unit and a sensor input unit, said input/output unit being coupled to receive said input data signals and transmit them to said control unit, and to receive said first control signals from said control unit and transmit output control signals to actuators for controlling said vehicle engine; and
transmission lines connected between said control unit and said input/output unit for transmitting said input data and said first control signals;
said input/output unit further comprising a backup logic device and a detector, wherein:

said backup logic device is coupled to receive said input data signals and said first control signals, and having a logic arrangement for processing said input data signals to generate backup control signals for controlling said vehicle engine; and said detector is coupled to receive said input data signals and said first control signals, for detecting failure of transmission of signals between said control unit and said input/output unit through said transmission lines in response to interruption of said first control signals while said engine cylinder signals continue, and for enabling said backup logic device to transmit said backup control signals to control continued operation of said vehicle engine during said interruption.

2. Apparatus according to claim 1 wherein said transmission lines are serial transmission lines and said control unit and said input/output unit each comprise respective parallel to serial and serial to parallel conversion units.

3. Apparatus according to claim 1, wherein said backup logic device comprises a large scale integrated circuit with logic circuitry for generating said backup control signals having at least one signal characteristic which has a predetermined time parameter.

4. Apparatus according to claim 1, wherein said detector further comprises an additional circuit for detecting a malfunction of said microprocessor, and for actuating said backup logic device to generate said backup control signals in response thereto.

5. Apparatus according to claim 3, wherein said detector further comprises an additional logic circuit for detecting a malfunction of said microprocessor, and for actuating said backup logic device to generate said backup control signals in response thereto.

6. Apparatus according to claim 4, wherein said additional logic circuit comprises first and second bistable elements, both of which are set by periodic pulse signals generated by said microcomputer during normal operation thereof, and reset by periodic pulse signals from a frequency generator unit; and second bistable element is enabled in response to a set output from said first bistable element.

7. Apparatus according to claim 1, wherein said control signals comprise a series of pulses for controlling a system of said vehicle engine, said control signals having time parameters calculated by said microprocessor, and wherein said backup control signals comprise pulses having at least one predetermined parameter for controlling said system of said vehicle engine.

8. Apparatus according to claim 3, wherein said control signals comprise a series of pulses for controlling a system of said vehicle engine, said control signals having time parameters calculated by said microprocessor, and wherein said backup control signals comprise pulses having at least one predetermined time parameter for controlling said system of said vehicle engine.

9. Apparatus for controlling a vehicle engine, comprising:
a control unit having a microprocessor for receiving input data signals from sensors indicative of operating parameters of said vehicle engine, and for generating first control signals to control operation of said vehicle engine in response to said input data signals;
an input/output device for inputting said input data signals to said microprocessor and for transmitting said first control signals from said microprocessor to actuators for controlling said vehicle engine;
said input/output device having a backup logic device, which is coupled to receive said input data signals and which has a logic arrangement for processing said input data signals to generate backup control signals for controlling said vehicle engine; and a detector for detecting interruption of said first control signals while said input data signals continue, and for enabling said backup logic device in response thereto to transmit said backup control signals to control continued operation of said vehicle during said interruption.

10. Apparatus according to claim 9, wherein said backup logic device comprises a large scale integrated circuit with logic circuitry for generating said backup control signals having at least one signal characteristic which has a predetermined time parameter.

11. Apparatus according to claim 10, wherein said detector further comprises an additional circuit for detecting a malfunction of said microprocessor, and for actuating said backup logic device to generate said backup control signals in response thereto.

12. Apparatus according to claim 11, wherein said control signals comprise a series of pulses for controlling a system of said vehicle engine, said control signals having time parameters calculated by said microprocessor, and wherein said backup control signals comprise pulses having at least one predetermined parameter for controlling said system of said vehicle engine.

13. Method for controlling a vehicle engine having a control unit with a microprocessor for receiving input data signals from sensors indicative of operating parameters of said vehicle engine, and for generating first control signals to control operation of said vehicle engine in response to said input data signals, and an input/output device comprising a backup logic device and a detector, for inputting said input data signals, including engine cylinder signals indicative of operation of said vehicle engine, to said microprocessor and for transmitting said first control signals from said microprocessor to actuators for controlling said vehicle engine, said method comprising the steps of:

processing said input data signals in said backup logic circuit to generate backup control signals for controlling said vehicle engine;

detecting an interruption of transmission of said first control signals, while said input data signals continue; and in response to detection of said interruption, enabling said backup logic device to transmit said backup logic signals to said actuators in place of said first control signals.

* * * * *